3,467,676
5-HYDROXY-2,2,7-TRIALKYLCHROMAN-4-ONES
AND DERIVATIVES
Timothy Y. Jen, Havertown, Gordon A. Hughes, Haverford, and Herchel Smith, Wayne, Pa., assignors to American Home Products Corporation, New York, N.Y., a corporation of Delaware
No Drawing. Filed Apr. 5, 1967, Ser. No. 628,522
Int. Cl. C07f 1/02, 1/06; C07d 7/26
U.S. Cl. 260—345.2
3 Claims

ABSTRACT OF THE DISCLOSURE 5-hydroxy-2,2,7-trialkylchroman-4-ones, alkali metal salts and etherified derivatives thereof (I) are prepared by condensing a 5-alkylresorcinol (II) with a dimethylacrylyl halide (III) in the presence of a catalyst and, if required, etherifying or forming a salt with an alkali metal base. Compounds (I) are central nervous system depressants useful to treat anxiety, tension and phychosomatic symptoms in warm-blooded animals.

This invention relates to substituted chroman-4-ones. More particularly, it relates to 5-hydroxy-2,2,7-trialkylchroman-4-ones and to salts and ethers thereof. The instant compounds have depressant properties and thus are useful in the amelioration of anxiety, tension and psychosomatic symptoms, such as agitation and the like.

DESCRIPTION OF THE INVENTION

The compounds contemplated by the invention are those of Formula I:

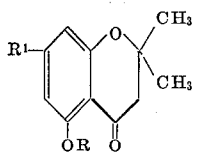

wherein R is hydrogen, benzyl or alkali metal selected from lithium, sodium or potassium; and $R^1$ is alkyl of from about 1 to about 12 carbon atoms.

When used herein and in the appended claims "alkyl of from about 1 to about 12 carbon atoms" includes straight and branched chain hydrocarbon radicals, illustrative members of which are: methyl, ethyl, propyl, i-propyl, n-butyl, i-butyl, t-butyl, n-pentyl, n-hexyl, 3-methylpentyl, 2-ethylbutyl, n-octyl, n-nonyl, n-decyl, n-undecyl, n-dodecyl, 2,3-dimethylheptyl, and the like. "Alkali metal" includes lithium, sodium or potassium.

Special mention is made of particularly valuable embodiments of this invention. These are 2,2-dimethyl-5-hydroxy-7-n-pentyl-chroman-4-one, a compound of Formula I wherein R is hydrogen and $R^1$ is n-pentyl; and 5-benzyloxy-2,2-dimethyl-7-n-pentylchroman-4-one, a compound of Formula I where R is benzyl and $R^1$ is n-pentyl. These compounds exert especially useful depressant activity in warm blooded mammals.

The compounds of this invention can be obtained in a number of ways. One especially convenient means to obtain compounds of Formula I comprises reacting a 5-alkylresorcinol of Formula II:

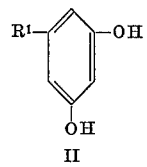

wherein $R^1$ is as defined hereinabove, with a dimethylacrylyl halide of Formula III:

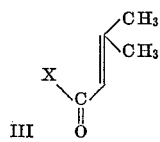

wherein X is chlorine or bromine, in the presence of a condensation agent such as a metal halide, e.g., aluminum chloride or aluminum bromide, preferably aluminum chloride, or an obvious chemical equivalent thereof, until formation of the chroman-4-one ring is substantially complete and then, if required, etherifying the 5-hydroxy group with a benzylating agent such as a benzyl halide, e.g., benzyl bromide, or a benzyl sulfate, or an obvious chemical equivalent thereof, or, if required, forming an alkali metal salt thereof by reaction with an alkali metal base such as a hydroxide or a carbonate or an obvious chemical equivalent thereof.

The alkylresorcinol starting materials of Formula II are readily available or can be easily made as described by C. M. Suter and A. W. Weston, J. Am. Chem. Soc., 61, 232 (1939).

The dimethylacrylyl halides of Formula III also are readily available or can be easily prepared. For example, β-di-methylacrylyl chloride is prepared according to the procedure of H. Staudinger and E. Ott, Berichte, 44, 1636 (1911).

The formation of the 5-hydroxy-2,2,7-trialkylchroman-4-one is accomplished by bringing the reactants together in an inert solvent, such as about 10 parts by volume of nitrobenzene, based on the reactants, and then adding to the mixture the desired condensing agent, such as aluminum chloride. The reaction conditions are not particularly critical; the condensation occurs smoothly at temperatures of from about 10° C. to about 100° C., and it is especially convenient to use about 25° C. The reaction time depends on the temperature of the medium and the nature of the reactants. Generally, from about 12 to about 168 hours is sufficient; if room temperature, i.e., about 25° C., is used the condensation is substantially complete in about 96 hours. The product can be recovered by entirely conventional techniques. One especially useful means is to pour the reaction mixture into a mixture of ice and 10% aqueous hydrochloric acid. Ether is added and the ether extract is washed with brine until neutral. The ether is evaporated and the reaction solvent is removed by distillation (if nitrobenzene was used as the solvent, steam-distillation is very useful and preferred). The residue again is extracted with ether, the ether extract is washed with brine and again evaporated to leave the product as a residue. If desired, it may be purified by solution in a 1:1 mixture of benzene-hexane, then chromatographed on a column of neutral alumina. Elution with benzene-hexane affords the desired product, which may, if desired, be recrystallized from a mixture of hexane and ether.

The etherified derivatives included within the scope of Formula I are prepared, for example, by suspending the 5-hydroxy compound in acetone and treating it with a benzylating agent, such as benzyl bromide, in the presence of a basic acid acceptor, such as potassium carbonate. Reaction occurs especially readily at temperatures of about 55° C., which is near the reflux temperature of the mixture, and after completion of the reaction—about 12 hours is ample—the product can be recovered by diluting the reaction mixture with benzene, washing with brine, then with water, and evaporating the organic layer. Unreacted benzyl bromide can be removed by repeated evaporation with toluene. The product, which remains as a residue may, if desired, be purified by recrystallization from a lower alkanol, such as methanol.

The alkali metal derivatives of Formula I are prepared by conventional techniques. One useful means is to treat the 5-hydroxy compounds with a stoichiometrically equivalent amount of an aqueous solution of the appropriate alkali metal hydroxide or carbonate, then to freeze-dry the mixture leaving the desired derivative as a residue.

Compounds of Formula I possess valuable pharmaceutical properties. In particular these new compounds possess central nervous system activity and are useful as depressants. Because of this property they are of importance in the treatment of anxiety tension states, agitation, hyperactivity, emotional disturbances resulting from environmental stress, and of like conditions which respond to treatment with depressants.

When used for the purposes illustrated above, it may be desirable according to conventional pharmaceutical practice to combine the specific compound selected into compositions suitable for enteral or parenteral administration by formulation with a pharmaceutically acceptable organic or inorganic carrier. The composition may be prepared in solid form, such as tablets or in liquid form such as a solution, suspension or emulsion. Suitable carriers include water, gelatin, lactose, starch, talc, vegetable oils, alcohols, polyalcohols, gums, syrups and the like. The pharmaceutical composition in addition to the active principle and the carrier may include auxiliary materials such as coloring, stabilizing, wetting or emulsifying agents. It is, of course, to be understood that the carrier as well as any other materials present with the active principle be inert with respect thereto.

The dosage of the present therapeutic agents will vary with the form of administration and the particular compound selected. Furthermore, the dosage will vary with the particular subject being treated. Generally treatment is initiated with small dosages, substantially less than the optimum dose of the compound. Thereafter, dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about .4 mg./kg. to about 17 mg./kg. per day for a warm blooded animal. However, a dosage level that is in the range of from about 2.0 mg./kg. to about 8.5 mg./kg. per day is most desirably employed to achieve effective results.

DESCRIPTION OF THE PREFERRED EMBODIMENTS

The following examples show representative products of this invention. They are merely illustrative and are not to be construed to limit the scope of the claims in any manner whatsoever.

EXAMPLE 1

2,2-dimethyl-5-hydroxy-7-n-pentylchroman-4-one

To a solution of 20.0 g., 0.111 mole, of 5-n-pentyl-resorcinol and 13.8 g., 0.117 mole, of β-dimethylacrylyl chloride in 240 ml. of nitrobenzene is slowly added 36.3 g., 0.27 mole, of aluminum chloride. The mixture is allowed to stand for 96 hours at about 25° C., then it is poured into a mixture of ice and 10% hydrochloric acid. The mixture is extracted with ether and washed with brine. The ether is evaporated and the nitrobenzene is removed by steam distillation. The residue is extracted with ether and the extract is washed with brine and dried over anhydrous sodium sulfate. Evaporation of the ether leaves a gum, which is dissolved in benzene-hexane (1:1) and passed through a column of neutral alumina (200 g.). Elution with 500 ml. of benzene-hexane (1:1) affords 5.5 g. of product, which is recrystallized from hexane-ether, M.P. 85–87° C., and 1 g. of less pure product from the mother liquor. From more polar solvents, there is obtained 1.62 g. of crystalline product;

$\lambda^{KBr}_{max.}$ 3.25–3.75 (broad), 6.10, 6.30 (broad) $\mu$; $\lambda^{CHCl_3}_{max.}$ 3.1–3.2, 6.03$\mu$; $\lambda^{EtOH}_{max.}$ 279 m$\mu$ ($\epsilon$ 14,300)

EXAMPLE 2

5-benzyloxy 2,2-dimethyl-7-n-pentyl-chroman-4-one

A stirred suspension of 1.0 g. of 2,2-dimethyl-5-hydroxy-7-n-pentylchroman-4-one, 0.8 ml. of benzyl bromide and 1.5 g. of potassium carbonate in 25 ml. of acetone is refluxed for 12 hours. The mixture is diluted with benzene, washed with water, then with brine, the organic layer is separated and dried then evaporated to leave an oil. The excess benzyl bromide is removed by repeated evaporation with toluene. The gummy residue crystallizes in methanol to afford 1.0 g. of the product, M.P. 45–46° C.

$\lambda^{KBr}_{max.}$ 6.01 m$\mu$; $\lambda^{EtOH}_{max.}$ 277 m$\mu$ ($\epsilon$ 17,500)

From the mother liquor, a second crop, weighing 150 mg., M.P. 44–46° C., is obtained.

*Analysis.*—Calc. for $C_{23}H_{28}O_3$: C, 78.37; H, 8.01. Found: C, 78.15; H, 7.72.

EXAMPLE 3

2,2-dimethyl-5-hydroxy-7-n-pentylchroman-4-one, sodium salt

A suspension of 500 mg. of 2,2-dimethyl-5-hydroxy-7-n-pentylchroman-4-one in 5 ml. of water is treated with one stoichiometric equivalent of sodium carbonate as a 10% by weight aqueous solution. The reaction mixture is freeze-dried, leaving the desired product as a residue.

EXAMPLE 4

The procedures of Examples 1–3 are repeated substituting stoichiometrically equivalent amounts of appropriately-substituted 5-alkyl resorcinols, dimethylacrylyl halides and alkali metal carbonates or hydroxides for the reagents used therein. The following 5-hydroxy-2,2,7-trialkylchroman-4-ones and derivatives are obtained.

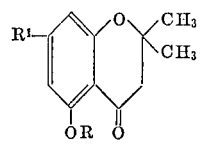

| R: | $R^1$ |
|---|---|
| H | $CH_3$ |
| H | $CH_2(CH_2)_{10}CH_3$ |
| H | $CH(CH_3)CH(CH_3)(CH_2)_4CH_3$ |
| K | $CH_2(CH_2)_4CH_3$ |
| Li | $CH_2(CH_2)_4CH_3$ |

We claim:
1. A compound of the formula

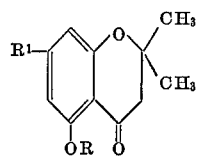

wherein R is hydrogen, benzyl or alkali metal selected from lithium, sodium or potassium; and $R^1$ is alkyl of from about 1 to about 12 carbon atoms.
2. 2,2-dimethyl-5-hydroxy-7-n-pentylchroman-4-one.
3. 5-benzyloxy-2,2-dimethyl-7-n-pentylchroman-4-one.

References Cited
UNITED STATES PATENTS 2,350,804  6/1944   Ohta _____ 260—345.2 XR
3,154,565  10/1964  Linn et al. _____ 260—345.2

HENRY R. JILES, Primary Examiner
JOHN M. FORD, Assistant Examiner

U.S. Cl. X.R.
260—999